United States Patent
Steidl et al.

(10) Patent No.: US 10,619,704 B2
(45) Date of Patent: Apr. 14, 2020

(54) ACTUATOR ARRANGEMENT FOR APPLYING A TORQUE TO A SHAFT, IN PARTICULAR A CRANKSHAFT OF A RECIPROCATING PISTON ENGINE, AND A CORRESPONDING METHOD

(71) Applicant: Hasse & Wrede GmbH, Berlin (DE)

(72) Inventors: Michael Steidl, Berlin (DE); Thierry Cabon, Teltow (DE); Markus Mali, Glienicke/Nordbahn (DE); Florian Knopf, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 191 days.

(21) Appl. No.: 15/536,856

(22) PCT Filed: Dec. 16, 2015

(86) PCT No.: PCT/EP2015/079923
§ 371 (c)(1),
(2) Date: Jun. 16, 2017

(87) PCT Pub. No.: WO2016/096941
PCT Pub. Date: Jun. 23, 2016

(65) Prior Publication Data
US 2017/0350471 A1 Dec. 7, 2017

(30) Foreign Application Priority Data
Dec. 18, 2014 (DE) .................. 10 2014 119 085

(51) Int. Cl.
*F16F 15/26* (2006.01)
*F02B 75/06* (2006.01)
(Continued)

(52) U.S. Cl.
CPC ............ *F16F 15/26* (2013.01); *B60W 10/08* (2013.01); *B60W 20/00* (2013.01); *B60W 20/17* (2016.01);
(Continued)

(58) Field of Classification Search
CPC .. B60K 6/40; B60K 6/485; B60K 2006/4825; B60K 2006/4808; B60K 25/02; B60K 6/24; B60L 2240/423
See application file for complete search history.

(56) References Cited

U.S. PATENT DOCUMENTS 5,637,041 A  6/1997  Hamaekers et al.
5,823,282 A  10/1998  Yamaguchi
(Continued)

FOREIGN PATENT DOCUMENTS

DE  195 32 129 A1  3/1997
DE  103 04 559 A1  9/2004
(Continued)

OTHER PUBLICATIONS

International Search Report (PCT/ISA/210) issued in PCT Application No. PCT/EP2015/079923 dated Apr. 8, 2016 with English translation (Four (4) pages).
(Continued)

*Primary Examiner* — Long T Tran
(74) *Attorney, Agent, or Firm* — Crowell & Moring LLP

(57) ABSTRACT

An actuator arrangement for applying a torque to a shaft of a machine, in particular a reciprocating piston engine, includes: a) at least one actuator device for applying the torque; and b) at least one rotatable seismic mass coupled to the shaft. The at least one actuator device is designed to apply the torque to the shaft between the seismic mass and
(Continued)

the shaft. A corresponding method is provided for active damping of torsional vibrations of the shaft having the actuator arrangement.

15 Claims, 6 Drawing Sheets

(51) Int. Cl.
| | |
|---|---|
| *F16F 15/14* | (2006.01) |
| *B60W 30/20* | (2006.01) |
| *F16F 15/30* | (2006.01) |
| *B60W 20/17* | (2016.01) |
| *B60W 20/00* | (2016.01) |
| *B60W 10/08* | (2006.01) |
| *F02B 63/04* | (2006.01) |
| *F15B 11/08* | (2006.01) |
| *F16F 15/121* | (2006.01) |
| *F16F 15/123* | (2006.01) |
| *F16F 15/00* | (2006.01) |
| *F02N 11/04* | (2006.01) |
| *F04C 2/08* | (2006.01) |
| *F04C 2/34* | (2006.01) |

(52) U.S. Cl.
CPC ........... *B60W 30/20* (2013.01); *F02B 63/042* (2013.01); *F02B 75/06* (2013.01); *F15B 11/08* (2013.01); *F16F 15/123* (2013.01); *F16F 15/1216* (2013.01); *F16F 15/14* (2013.01); *F16F 15/30* (2013.01); *B60W 2710/083* (2013.01); *F02N 11/04* (2013.01); *F04C 2/08* (2013.01); *F04C 2/34* (2013.01); *F15B 2211/2053* (2013.01); *F16F 15/002* (2013.01)

(56) References Cited

U.S. PATENT DOCUMENTS

| | | | | |
|---|---|---|---|---|
| 5,927,452 | A | * | 7/1999 | Freise ................. B60K 6/40 192/3.52 |
| 6,026,709 | A | | 2/2000 | Depp et al. |
| 6,116,364 | A | * | 9/2000 | Taguchi ............... B60K 6/405 180/65.26 |
| 6,138,629 | A | * | 10/2000 | Masberg .............. B60K 6/26 123/192.1 |
| 6,405,701 | B1 | | 6/2002 | Masberg et al. |
| 2004/0116191 | A1 | | 6/2004 | Pape et al. |
| 2005/0166594 | A1 | * | 8/2005 | Jayabalan ........... B60K 6/485 60/698 |
| 2010/0210409 | A1 | * | 8/2010 | Friesen ............... B60K 6/485 477/3 |
| 2013/0248248 | A1 | | 9/2013 | Steidl et al. |
| 2013/0281258 | A1 | * | 10/2013 | Reitz ................... B60K 6/383 477/5 |
| 2016/0281258 | A1 | * | 9/2016 | Uddin .................. C25D 7/00 |
| 2016/0359441 | A1 | * | 12/2016 | Calverley ............ H02P 6/00 |

FOREIGN PATENT DOCUMENTS

| | | |
|---|---|---|
| DE | 10 2007 043 737 A1 | 3/2009 |
| DE | 10 2010 046 849 B4 | 5/2012 |
| DE | 10 2011 084 092 A1 | 4/2013 |
| EP | 1 266 152 B1 | 11/2004 |
| WO | WO 2014/118245 A1 | 8/2014 |

OTHER PUBLICATIONS

German-language Written Opinion (PCT/ISA/237) issued in PCT Application No. PCT/EP2015/079923 dated Apr. 8, 2016 (Seven (7) pages).

* cited by examiner

ACTUATOR ARRANGEMENT FOR APPLYING A TORQUE TO A SHAFT, IN PARTICULAR A CRANKSHAFT OF A RECIPROCATING PISTON ENGINE, AND A CORRESPONDING METHOD

BACKGROUND AND SUMMARY OF THE INVENTION

The invention relates to an actuator arrangement for applying a torque to a shaft of a machine, in particular a crankshaft of a reciprocating piston engine. The invention relates to a corresponding method.

Machine shafts such as crankshafts in reciprocating piston engines are subject to torque irregularities, known as rotary oscillation or torsional vibration due to intermittent drive torques.

Rotary oscillations of such kind can be reduced with passive systems, such as torsional vibration dampers (also called "visco dampers" with viscous medium), equipped with an inertia ring. Examples of these are described in EP 1266152B1, U.S. Pat. Nos. 6,026,709A, and 5,637,041 A.

German patent document DE10 2010 046 849 B4 describes a sensor-based control of vibration in slender continua, specifically torsional vibration in drill strings. A theory for calculating working shaft on the basis of two measurement points is presented.

Other active systems for vibration damping with an actuator are known from DE 195 32 129 A1 and DE 103 04 559 A1. In the latter document, an actuator acts on a transmission of a vehicle powertrain which is connected downstream of a reciprocating piston engine crankshaft via a dual mass flywheel. However, due to the decoupling effect of the dual mass flywheel it is not possible to reduce or excite vibration in the crankshaft.

Document WO 2014/118245 A1 describes an active system for vibration damping which includes an actuator. The shaft of WO 2014/118245 A1 is a crankshaft of the reciprocating piston engine which has a front end and a driven end. The reciprocating piston engine may be for example a diesel, gasoline or gas engine, and may be used for various purposes, as an automobile power unit for example. The crankshaft may include—preferably at a driven end—a flywheel, a dual mass flywheel for example, to which a powertrain of an automobile having a drive transmission is connected downstream.

A torque is applied to a shaft of an internal combustion engine to start the machine, typically by means of a starter motor. In the case of hybrid machines in automobiles, the electric motor of the hybrid machine can also be used for this. This electric motor may be switched into a generator mode for braking, in which case the electric motor then produces electrical energy as a generator.

The need for effective damping devices is constant, not only to prolong the service life of the parts affected by vibration, but at the same time also to reduce maintenance costs.

The object of the present invention therefore consists in providing an improved actuator arrangement and an improved method for applying a torque to a machine shaft.

This object is solved with an actuator arrangement for applying a torque to a shaft of a machine, particularly a reciprocating piston machine, with at least the following features:

a) at least one actuator device for applying for torque,
b) at least one rotatable seismic mass coupled with the shaft,
c) wherein the at least one actuator device is designed to apply the torque between the seismic mass and the shaft. This object is also solved with a method for applying a torque to a shaft of a machine, in particular to a crankshaft of a reciprocating piston machine, with the above actuator arrangement, with the method including the steps of:

(S1) detecting a requirement for torque;
(S2) determining actuation data for the at least one electrical machine on the basis of the requirement for torque detected; and
(S3) applying the torque to the shaft by actuating the at least one electrical machine to drive the at least one actuator device.

Accordingly, an actuator arrangement according to the invention for applying a torque to a shaft of a machine, in particular a reciprocating piston engine comprises a) at least one actuator device for applying the torque, and b) at least one rotatable seismic mass coupled to the shaft, c) wherein the at least one actuator device is designed to apply the torque between the seismic mass and the shaft.

A "seismic" mass is a physical mass which in this case becomes a "seismic" mass by virtue of its construction, e.g. as an inertia ring, arrangement and coupling, as is known from vibration measurement technology. The seismic mass in the form of a flywheel and/or inertia ring is connected to a rotatable body, in the present case a shaft, and rotates with it at the same rotating speed. In a passenger car, a moment of inertia I of such a seismic mass is in a range from e.g. 0.01 to 0.5 kgm2, in a commercial vehicle in a range from e.g. 0.1 to 3 kgm2, in a stationary machine (EPG) in a range from e.g. 3 to 100 kgm2 and in a large two-stroke internal combustion engine in a range from e.g. 100 to 35,000 kgm2. The seismic mass forms a practically absolute reference system with regard to the shaft, with respect to which differences from the rotating speed of the shaft are induced, caused for example by rotary oscillations from a shaft drive system, e.g., a reciprocating piston engine. The shaft is therefore preferably a crankshaft of a reciprocating piston engine and the at least one actuator device is designed to apply a torque between the seismic mass and the crankshaft of the reciprocating piston engine.

The advantage of the co-rotating seismic mass consists in the low speed differentials between the shaft and the seismic mass. In other words, the speed differential between the shaft and the seismic mass results solely from the rotary oscillation superimposed on the uniform rotation of the shaft and the seismic mass. In this context, the term speed is understood to refer to rotating speed.

A method according to the invention for applying a torque to a shaft of a machine, in particular a crankshaft of a reciprocating piston engine, in particular with the actuator arrangement according to the invention, comprises the method steps (S1) detecting a requirement for torque; (S2) determining actuation data for the at least one electrical machine on the basis of the detected requirement for torque; and (S3) applying the torque to the shaft by actuating the at least one electrical machine to drive the at least one actuator device.

The actuator device according to the invention is particularly suitable for damping rotary oscillations of the shaft, wherein the method according to the invention for active damping of rotary oscillations of the machine shaft provides in method step (S1) for detecting rotary oscillation information relating to the shaft with the at least one measuring device, in method step (S2) for determining actuation data for the at least one electrical machine on the basis of the detected input data, and in method step (S3) for active damping of the rotary oscillations of the shaft by actuating the at least one electrical machine to drive the at least one actuator device.

Thus, the actuator device according to the invention offers a significant advantage in that it is capable of combining various applications for applying the torque to the shaft. For example, the application of torque may be used for an acceleration process, e.g., a starting process for an engine to which the shaft is attached, for a braking process and to damp rotary oscillations of the shaft.

In a further variant, the actuator arrangement is designed to apply an alternating torque to the shaft. The term "alternating torque" is defined as follows.

With alternating torque, the torque curve crosses the zero line from positive values to negative values and vice versa. Of course, this curve may also be periodic, damped or undamped, or even cumulative in certain time intervals. Such an alternating torque is applied to a shaft particularly for damping rotary oscillations thereon.

If the torque were applied to damp the rotary oscillations between the rotating shaft and an immobile reference point, the dissipated output with a viscous damper would be very high, since the damper would also decelerate the uniform rotary motion.

If an active system with an actuator such as is described in the prior art is to be used to damp rotary oscillations of the shaft, one possible variant for an actuator would be the use of an electric motor with a fixed stator and a rotor secured to the shaft on which the rotary oscillations occur. In this context, it is considered disadvantageous that the electric motor requires a very high nominal output. This is calculated with the formula P=Mw wherein M stands for the required torque and co for the angular velocity of the shaft. Since the alternating torque needed to damp the rotary oscillations in internal combustion engines is typically in the same order of magnitude as the nominal torque of the internal combustion engine, the actuator would have to be capable of delivering a nominal output in the same order of magnitude as the internal combustion engine. This is not conceivable except for special applications (hybrid, generator). However, with a rotor that co-rotates at the same speed as the shaft, the energy required to supply the actuator would have to be transferred contactlessly.

A defined alternating torque may be applied to a rotating shaft to reduce rotary oscillations or to generate rotary oscillations. In fulfillment of the law that states "For every action there is an equal and opposite reaction", it follows that this torque must be counterbalanced. To address this, two suggested solutions are to support this torque a) against a spatially fixed point or b) against a co-rotating seismic mass.

If the actuator of this torque were an electric motor, for example, in the case of a) the stator of the electric motor would be spatially fixed, and in the case of b) the stator of the electric motor would be secured on the co-rotating seismic mass.

In the case of a), the problem arises that the engine output delivered at any given time P(t) can be very high. If the shaft is rotating with an angular velocity and an alternating torque to be applied has a certain value, a current output P(t) may have an average value of zero, but the electric motor must still be of correspondingly large dimensions.

This may be explained more clearly with an example. In order to reduce vibration in the crankshaft of a truck internal combustion engine, an alternating torque of 2 kNm must be applied for a rotating speed of 1800 rpm. As a result, the amplitude of the current power output from the electric motor is approximately 377 kW. An electric motor capable of delivering this power is big, heavy and expensive.

This problem does not exist in case b), since the stator and the rotor of the electric motor are rotating at almost the same speed due to the co-rotating seismic mass. However, in this case the supply of electrical power to the electric motor via slip rings (wear, maintenance) and inductive processes presents a significant disadvantage. Furthermore, here too the actuator (an electric motor in the example) must apply the alternating torque of 2 kNm, which requires a correspondingly large, expensive electric motor and is also unfavorable.

In contrast to the above suggestions, the invention solves the aforementioned difficulties associated with avoiding the drawbacks of a) and b) as follows, with a) at least one actuator device for applying a torque serving in particular to damp rotary oscillations of the shaft, and b) at least one rotatable seismic mass coupled with the shaft, c) wherein the at least one actuator device is designed to apply the torque for damping rotary oscillations of the shaft between the seismic mass and the shaft.

The torque for damping rotary oscillations of the shaft is applied between the seismic mass and the shaft by the at least one actuator device. This forms and preferably creates a coupling between the seismic mass and the shaft. In this way, the torque that is to be applied to the shaft to excite or reduce rotary oscillations of the shaft can be applied simply and in suitable manner.

One variant provides that the rotatable seismic mass is coupled with the shaft in such manner that the rotatable seismic mass rotates at the same rotating speed as the shaft. This enables the torque that is to be applied to the shaft to damp rotary oscillations of the shaft to be kept small. However, it is also conceivable to enable co-rotation of the seismic mass sometimes at the same speed and sometimes at a different speed depending on the operating state.

The actuator arrangement has at least one electrical machine for supplying driving energy for the at least one actuator device. An electrical machine of compact construction can be produced quite simply.

In one variant, the actuator arrangement includes at least one transmission, via which the at least one actuator device is coupled to the at least one electrical machine to receive its driving power. A transmission enables a particularly large number of options for applying alternating torque to a rotating shaft according to each individual application case.

In a further variant, the at least one transmission and the at least one actuator device are disposed on the at least one seismic mass. This enables a particularly compact construction.

It is provided that the transmission has a housing, which is fixedly connected to the seismic mass. This advantageously ensures that a transmission ratio can be created between the rotating speed of the seismic mass and the electrical machine in order to reduce the rotating speed and driving power of the electrical machine. Such a housing may provide bearing points and/or fastening points for transmission components, for example. Consequently, the transmission can be installed simply as single unit and easily replaced during maintenance operations. This also enables a compact construction.

In a further variant, the rotatable seismic mass and the electrical machine together with the shaft have the same axis of rotation, which simplifies the construction.

This also offers the advantage that the power output from the electrical machine can be kept relatively low (about 5 kW for a truck engine), and a required installation space is also relatively small.

In this context, in one variant it is provided that the at least one electrical machine has the form of an electric motor with a stator and a rotor, wherein the stator is fastened in fixed manner to a frame and the rotor is coupled with the at least one actuator device either indirectly via the transmission or directly. In one variant, the electric motor may be designed for a rotating speed of ±16,000 rpm. In this way, it is possible to ensure highly dynamic regulation depending on the current state of the associated machine, e.g., a reciprocating piston engine.

The stator of the electric motor is mounted fixedly on the frame, e.g., the frame of the reciprocating piston engine. The rotor drives the actuator device located on the seismic mass, which co-rotates with uniform shaft velocity.

In one variant, the transmission is a gear transmission, wherein the at least one actuator device is in the form of an output gear of the transmission, and wherein a transmission input is coupled with the rotor of the at least one electrical machine. Gearwheels as components can be manufactured in high quality and enable a relatively simple construction.

In an alternative variant, the transmission has at least one generator and at least one electric motor, wherein the at least one electrical motor functions as the at least one actuator device, and wherein the at least one generator is coupled with the rotor of the at least one electrical machine. In this context, a "gear train" may advantageously be created by designing the respective electrical machine relatively simply, with a small number of moving parts.

In a preferred variant, the transmission includes at least one pump, which is in the form of a hydraulic pump, particularly a gear pump, and the at least one actuator device, wherein the pump is coupled with the rotor of the at least one electrical machine, and wherein the at least one actuator device is in the form of a radially arranged hydraulic cylinder of the pump, a displacement vane or a gear pump.

In one variant, the at least one actuator device is a hydraulic cylinder of a pump, which is a hydraulic pump, is, wherein the pump is arranged on the seismic mass and is coupled with the rotor of the at least one electrical machine. The seismic mass and thus also the pump rotate with the uniform shaft rotation velocity, wherein the torque for damping is generated by relative acceleration between the seismic mass and the shaft. In this way, the power output of the electrical machine is relatively low, as indicated earlier.

In an alternative variant, the at least one actuator device may include one or more piezoelements or piezoactuators, wherein the transmission is equipped with at least one generator for supplying energy to the one or more piezoelements, and is arranged on the seismic mass, and is coupled with the rotor of the at least one electrical machine.

The coupling of the seismic mass to the shaft may be assured only via the at least one actuator device, as described previously, for example, or in a further variant it may be constructed such that the at least one rotatable seismic mass is also coupled to the shaft via a spring unit. The spring unit may include parallel connected springs, e.g., torsion springs, or helical springs distributed around the circumference. The seismic mass is then connected and/or coupled to a front end of the shaft via the spring unit and via cylinders of the hydraulic pump.

The hydraulic cylinders and piezoactuators may produce a defined displacement (defined acceleration or defined torque) between the seismic mass to the shaft.

In a further variant, the actuator arrangement is equipped with a device for decelerating the shaft. In this context, the device for decelerating the shaft may comprise the at least one electrical machine for recovering energy. The recovered electrical energy may be stored e.g. in an automobile battery or an additional electrical energy accumulator.

In yet another variant, it is provided that the actuator arrangement includes a device for accelerating the shaft, wherein the at least one electrical machine generates acceleration processes. In this way, assistance can be provided to the machine associated with the shaft for starting processes and/or other operating states for example.

In a further variant, the actuator arrangement includes at least one controller for controlling the electrical machine and at least one measuring device for detecting rotary oscillation information relating to the shaft, wherein the controller is designed to control the electrical machine on the basis of the rotary oscillation information for the shaft detected by the measuring device for applying a torque for damping rotary oscillations of the shaft. This enables an advantageously simple central control for the actuator arrangement, wherein the essential current measurement values relating to the rotary oscillations of the shaft can be captured and rapidly processed by the measuring device. In this way, the controller is able to control the electrical machine so that the electrical machine drives the actuator device in such manner that the actuator device applies the torque for damping rotary oscillations of the shaft to the shaft, to enable accurate and precise rotary oscillation damping (or also rotary oscillation generation) in the shaft.

The controller of the actuator arrangement may also include a regulating unit for providing a superimposed rotating speed regulation of the seismic mass. In this way, it is advantageously assured that a uniform rotating speed of the seismic mass at a given time is equal to a uniform rotating speed of the coupled shaft at the same time.

In a variant of the method, in method step (S1) provision is made for simultaneous transfer of additional information from an engine controller (16) of the machine to be assigned. The operating state of the shaft with the associated machine or reciprocating piston engine may be detected using data relating to the rotating speed and angular position of the crankshaft and the current load of the machine, thereby enabling further improvement to the damping of rotary oscillations of the shaft.

In method step (S3), a torque for damping rotary oscillations of the shaft is generated between the shaft and seismic mass which co-rotates with the shaft by the at least one actuator device by relative acceleration between the seismic mass and the shaft. Consequently, the small speed differentials mean that it is only necessary to apply a relatively low torque.

The invention will now be explained in greater detail based on an exemplary embodiment and with reference to the accompanying drawings.

DETAILED DESCRIPTION OF THE DRAWINGS

Figure 1:
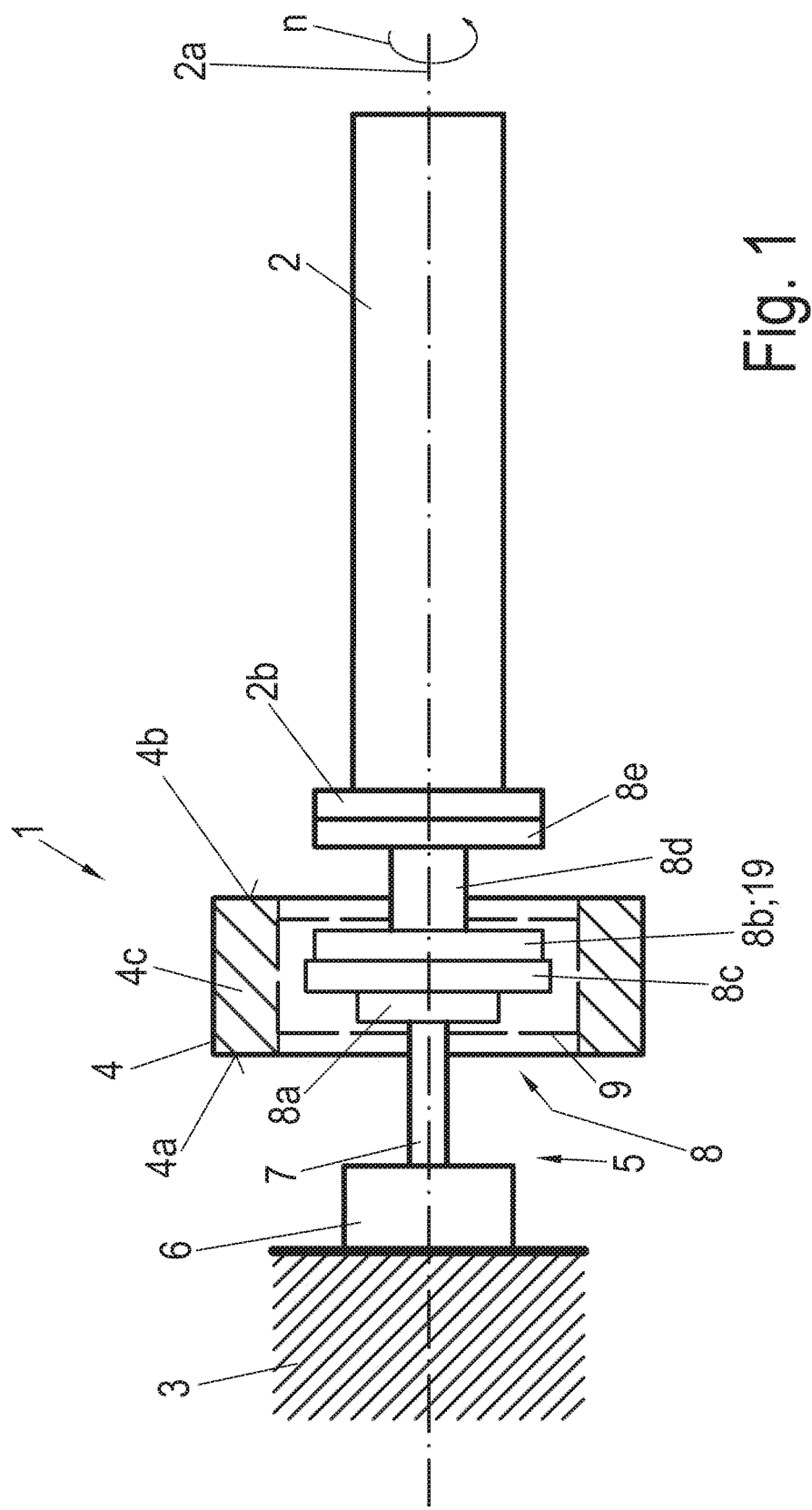
FIG. 1 is a schematic representation of an embodiment of an actuator arrangement according to the invention.

FIG. 1 shows a schematic representation of an embodiment of an actuator arrangement 1 according to the invention.

Actuator arrangement 1 is represented with a shaft 2 of a machine, e.g., a reciprocating piston engine (not shown). In this instance, shaft 2 is crankshaft of the reciprocating piston engine, which has a front end and a driven end. The reciprocating piston engine may be for example a diesel, gasoline or gas engine, and may be used for various purposes, as an automobile power unit, for example. The crankshaft may include—preferably at a driven end—a flywheel, a dual mass flywheel for example, to which a powertrain of an automobile having a drive transmission is connected downstream. A drive transmission is a transmission, e.g., an automobile transmission, which converts the engine speed to an input speed.

Shaft 2 rotates at a (variable) rotating speed n about its longitudinal axis, which is designated here as axis of rotation 2a.

Actuator arrangement 1 is provided for applying a torque to shaft 2 and comprises the shaft 2, a seismic mass 4, an electrical machine 5, a transmission 8 and at least one actuator device 19. With actuator arrangement 1 and the actuator device 19 thereof, preferably supplementary alternating torques are applied to crankshaft 2, which is already rotating due to the running reciprocating piston engine, which torques may in particular have the effect of exciting or damping vibrations. This application of supplementary torques preferably takes place directly at the crankshaft before the powertrain with the flywheel if provided.

Seismic mass 4 is designed as a kind of flywheel with a drive side 4a and a coupling side 4b. In the example shown, the seismic mass is formed with an inertia ring 4c. Exemplary diameters of seismic mass 4 are in a range from 0.15 m to 3.50 m. The material from which seismic mass 4 is made is e.g., gray cast iron, cast steel, steel and/or tungsten.

Electrical machine 5 is an electric motor with a stator 6 and a rotor 7. Stator 6 is spatially fixed and in this case mounted fixedly on a frame 3. In the case of an automobile, frame 3 may be the frame of the automobile, for example. In the case of a stationary machine, frame 3 may be e.g. the frame or the foundation of the machine. Rotor 7 is directly or indirectly coupled with the at least one actuator device 19 to drive it.

Here, seismic mass 4 and electrical machine 5 together with shaft 2 have the same axis of rotation 2a. It is also possible that they have different axes of rotation or approximately the same axis of rotation.

Transmission 8 comprises a transmission input 8a, a transmission output 8b, an intermediate stage 8c and a housing 9. Transmission 8 is a torque converter.

Transmission input 8a is located on the drive side 4a of seismic mass 4 and is coupled with rotor 7 of the electrical machine. Transmission output 8b is coupled with transmission input 8a in a certain gear ratio via intermediate stage 8c. In this example, transmission output 8b also comprises the at least one actuator device 19, which is coupled on the coupling side 4b of seismic mass 4 via an output shaft 8d and a coupling section 8e, e.g., a flange, with a front end 2b of the rotating shaft 2 to which an alternating torque is to be applied. Housing 9 of transmission 8 is braced against seismic mass 4, which co-rotates with rotating shaft 2. Here, housing 9 is only indicated schematically with a hatched area. Transmission 8 is described in greater detail below.

Actuator arrangement 1 is designed so as to apply a torque to shaft 2. Such a torque may be applied for various purposes. Accordingly, actuator arrangement 1 may serve not only to damp the rotary oscillations of shaft 2, but also either to decelerate shaft 2 and therewith also an entire powertrain coupled with shaft 2 in the case of an automobile in energy recovery mode or to accelerate shaft 2, e.g., to start the associated internal combustion engine.

A numerical example of rotary oscillation reduction in shaft 2 will now be presented. Shaft 2 is e.g. a crankshaft of a truck engine. At a rotating speed n of 1800 rpm of shaft 2, an alternating torque of 2 kNm is to be applied to shaft 2. For the purposes of the example, the reduction ratio of transmission 8 is assumed to be 1:10. Then, the alternating torque to be applied by the relatively small electrical machine 5 is only 200 Nm. Since housing 9 of transmission 8 co-rotates with seismic mass 4, the input side of transmission 8, i.e. transmission input 8a, also rotates at a speed of only 1800 rpm. In contrast to this, if housing 9 of transmission 8 were spatially fixed, transmission input 8a would rotate at a speed of 18,000 rpm.

In the exemplary case with the transmission ratio of 1:10, the amplitude of the power output by electrical machine 5 is only 37.7 kW (compared with 377 kW without the transmission ratio of 1:10).

In this way, therefore, both the power requirement and the torque of electrical machine 5 are reduced by the amount of the transmission ratio with the aid of this arrangement.

Figure 2:
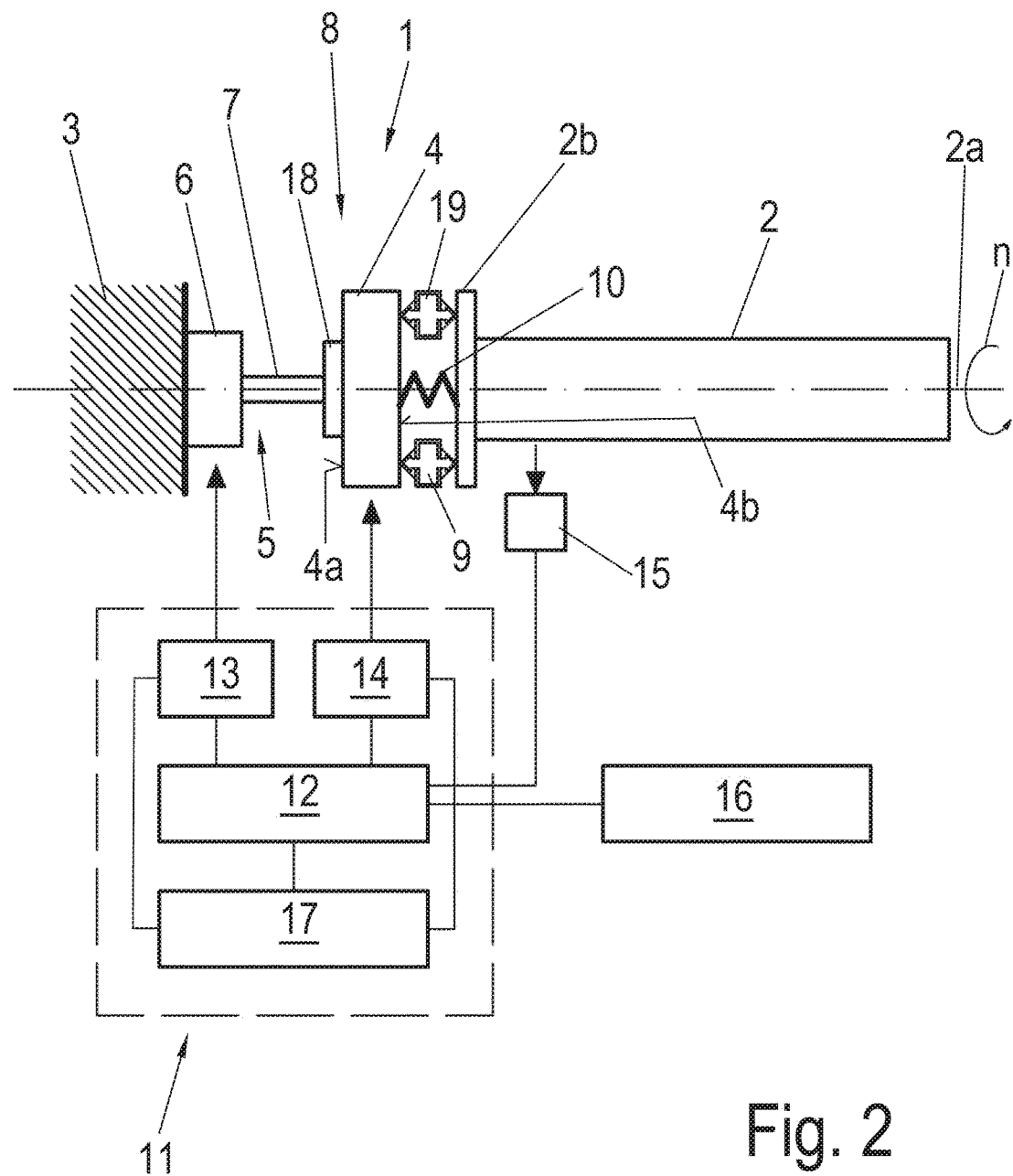
FIG. 2 is a schematic representation of a variant of the embodiment of FIG. 1.

FIG. 2 is a schematic representation of a variant of the embodiment of FIG. 1, wherein transmission 8 is constructed with a pump 18 and actuators 19. Transmission input 8a (see FIG. 1) is formed by a drive input of pump 18. Intermediate stage 8c is formed by the pump and actuator construction. Transmission output 8b consists of the coupling points between actuators 19 and the front end 2b of shaft 2.

A controller 11 is also represented; its function will be explained in greater detail below.

In this shown variant, seismic mass 4 is coupled with the coupling side 4b facing shaft 2 via actuators 19 and to the front end 2b of shaft 2 via a spring unit 10, and consequently rotates at the same rotating speed as shaft 2.

Spring unit 10 is an optional component and may consist of parallel connected springs, such as torsion springs or circumferentially disposed helical springs. Of course, other spring arrangements are also possible.

It is also possible for the seismic mass 4 to be coupled with front end 2b of shaft 2 solely via actuators 19, but this is not represented here.

A torque to be applied to shaft 2 is applied by actuators 19 between shaft 2 and coupling side 4b of the co-rotating seismic mass 4. The required torque is generated by the relative acceleration between seismic mass 4 and shaft 2. Consequently, the power required to generate the necessary torque remains relatively small, since the speed differential between seismic mass 4 and shaft 2 remains small. In an exemplary case of a truck engine, the power required for this is e.g., about 5 kW with damping of rotary oscillations of shaft 2.

The required energy, which is applied to actuators 19 for generating this torque, is delivered by electrical machine 5 from the drive side 4a of seismic mass 4. Rotor 7 is coupled with actuators 9 to drive them.

The electrical machine is realized as a high-speed electric motor with the required yet small power output (e.g., 5 kW for a truck engine). This high-speed electric motor may be capable of rotating at ±16,000 rpm. A torque engine for example may also be used as electrical machine 5.

In the example shown, pump 18 functions as a drive for actuators 19. Pump 18 is mounted on seismic mass 4, and in this example is a high-dynamic hydraulic pump. Then, the actuators 19 may be cylinders of the pump 18 in the form of a hydraulic pump. Rotor 7 of the electrical machine is coupled with pump 18 for drive purposes and drives pump 18 which is mounted on seismic mass 4 and co-rotates therewith and with shaft 2 at a uniform shaft speed (rotating speed of shaft 2).

Rotor 7 drives pump 18 directly. The cylinders of the high-dynamic hydraulic pump may bring about a defined displacement (defined acceleration and defined torque) between seismic mass 4 with respect to shaft 2.

A generator may also be arranged on seismic mass 4 instead of pump 18, which is not shown but may be imagined. In this context, actuators 19 may be piezoelements, for example, with are supplied with electrical energy by this generator.

The uniform rotating speed of the machine, e.g., an internal combustion engine, i.e. of shaft 2, presents no difficulties in this case, since the very rapid response time and significantly larger speed range of the high-speed electrical machine 5 enables the required speed to be applied additively to the uniform rotating speed n of shaft 2.

Controller 11 includes a control device 12, an engine control 13 for the electrical machine 5 and a regulating unit 14 for seismic mass 4. Controller 11 may also comprise one or more superimposed regulating devices 17 for the performance of other functions, such as energy recovery (generator mode of electrical machine 5), additional acceleration of shaft 2 among others.

In this context, control device 12 of controller 11 is also connected to at least one measuring device 15 and one engine controller 16 of the machine that is attached to shaft 2.

Measuring device 15 detects rotary oscillations of shaft 2 and may be constructed as described in document WO 2014/118245 A1 for example. The date collected in this way is transmitted to control device 12.

Further data about shaft 2, e.g., rotating speed n, including data on operating states of the machine are received by control device 12 from engine controller 16, which is connected to the machine. The data on operating states may also include torque requirements for shaft 2, e.g., deceleration or acceleration of the automobile, such as starting the machine.

Control device 12 processes this input data for engine control 13 in such manner that engine control 13 sends corresponding output data to the electrical machine for control and regulation thereof. Thus, highly dynamic regulation in response to the current state of the machine, e.g., an internal combustion engine, is possible. The regulation data also includes data on the electrical machine 5 that is collected and transmitted to engine control 13 while it is operating.

The actuation of electrical machine 5 with regulation of the rotary oscillations, i.e. damping of rotary oscillations of shaft 2, may be performed e.g. via an algorithm for active vibration damping, which is described in document WO 2014/118245 A1 and which is included by reference here.

With this arrangement, the torque for damping rotary oscillations of shaft 2 may be supplied with the aid of low-power actuators 19 on the basis of the seismic principle with seismic mass 4.

The masses or additional inertias of rotor 7 of electrical machine 5 and of the pump 18 mounted on seismic mass 4 including actuators 19 are not problematic in this arrangement, since a larger seismic mass 4 reduces the displacements that are required to damp rotary oscillations with the torques to be applied.

The task of regulating unit 14 consists in supplying a superimposed rotating speed regulation of seismic mass 4 such that a uniform rotating speed of seismic mass 4 at any given time is equal to the uniform rotating speed of shaft 2 at the same time.

Besides damping rotary oscillations of shaft 2, at the same time actuator arrangement 1 may also be used to decelerate the entire powertrain in an automobile connected therewith (recovery) or also to accelerate it (e.g., when starting the machine). Regulating device 17 described earlier is provided for this purpose. In the event that shaft 2 is decelerated, for example, electrical machine 5 may function as a generator for recovery, i.e. generate electrical power, which is stored in the automobile battery for example.

Figure 3:
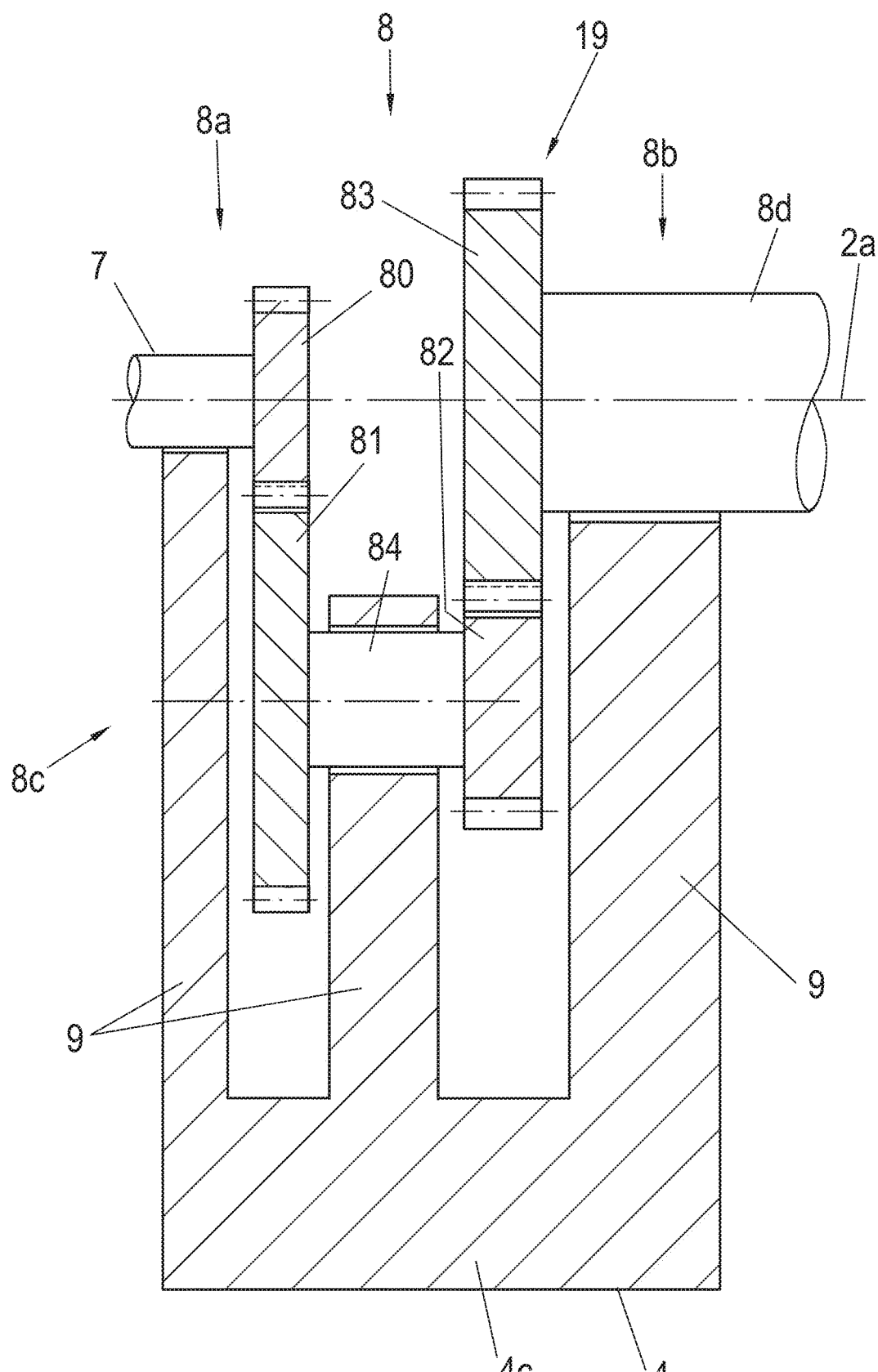
FIGS. 3-5 are schematic representations of variants of a transmission in the embodiment of FIG. 1.
Figure 4:
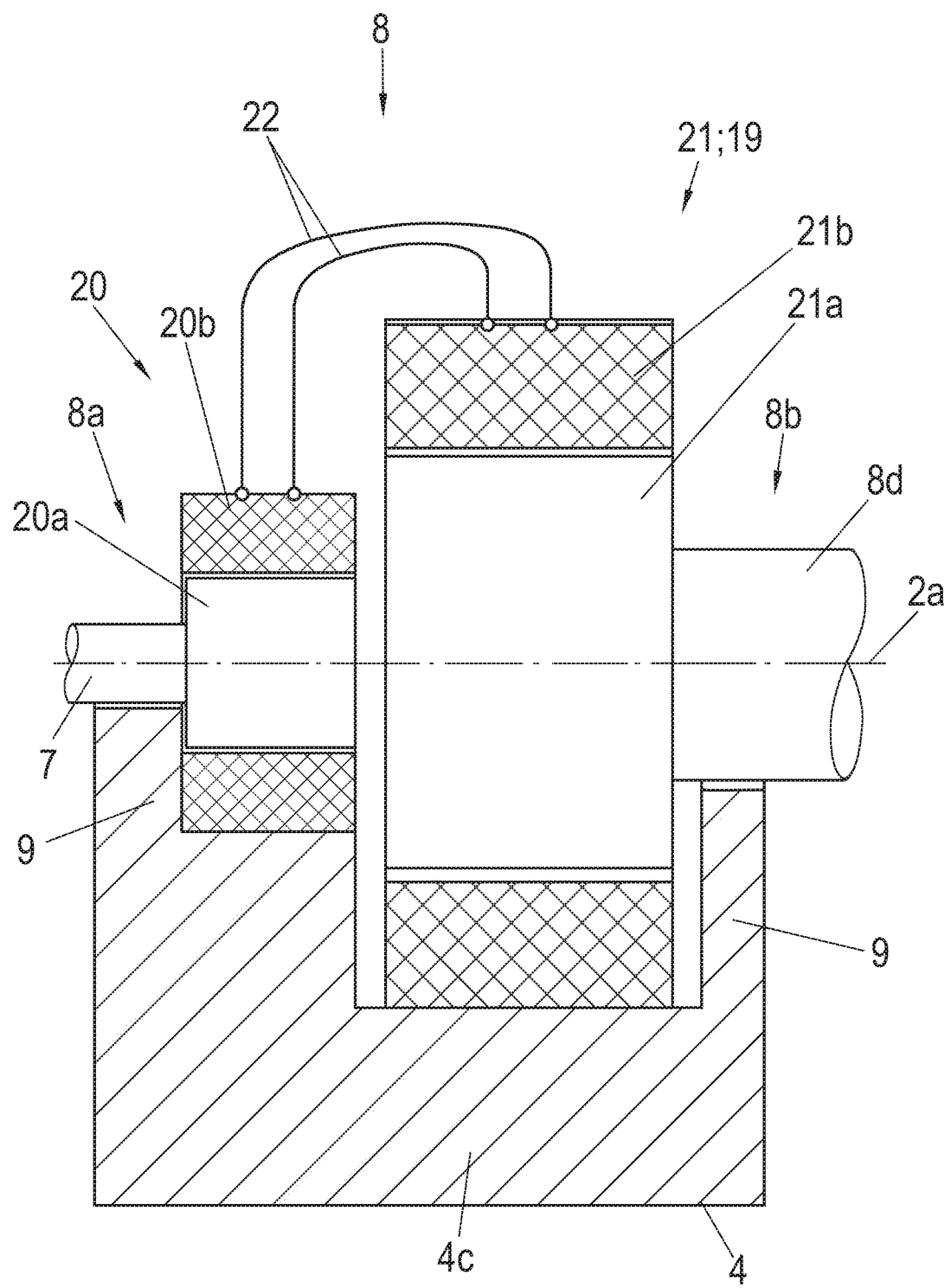
Figure 5:
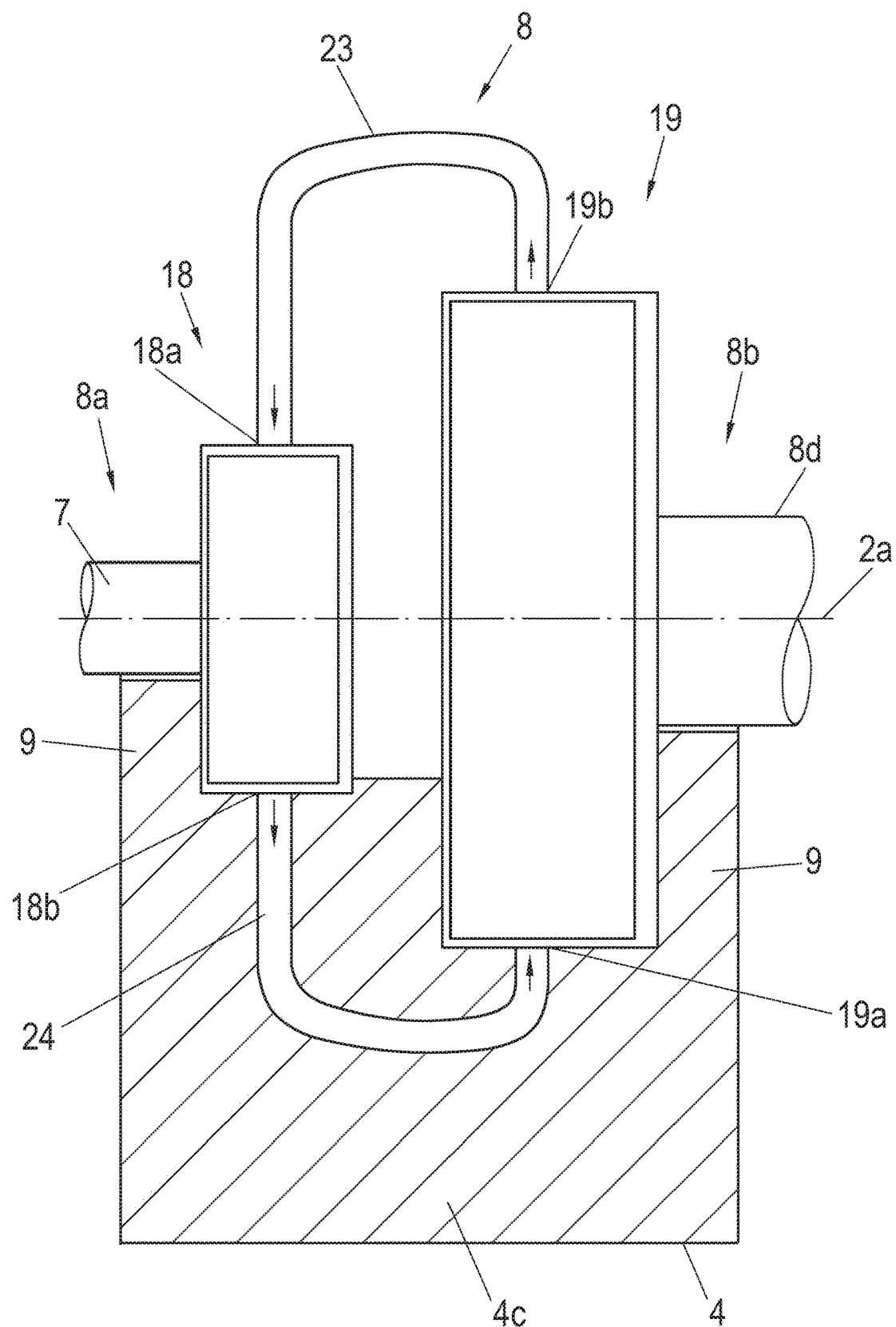

FIGS. 3-5 show schematic cross-sectional representations of variants of transmission 8 of the embodiment according to FIG. 1. FIG. 3 shows the transmission 8 as a gear transmission. In FIG. 4, transmission 8 is shown as an electric motor transmission, and FIG. 5 is a schematic representation of a hydraulic transmission.

In each of FIGS. 3-5, only half of seismic mass 4 is shown, in a lengthwise cross section in each case, wherein the respective other half can be easily imagined. Sections of the body of seismic mass 4 are realized as sections of the housing 9 of transmission 8 here, and are connected to the circumferential inertia ring 4$c$ and therewith also to the seismic mass 4.

Rotor 7 of electrical machine 5 (see FIG. 1) is rotatably supported as transmission input 8$a$ in a section of housing 9 facing towards electrical machine 5 and the end thereof that protrudes into housing 9 is furnished with a non-rotatable input gear 80.

Similarly, output shaft 8$d$ is rotatably supported as transmission output 8$b$ in a section of housing 9 facing towards shaft 2. A non-rotatable output gear 83 is mounted on the end thereof that protrudes into housing 9.

In this variant, output gear 83 is designed as the at least one actuator device 19.

A further section of housing 9 is arranged between the two housing sections, and functions as a bearing point for an intermediate shaft 84 of intermediate stage 8$c$. The end of intermediate shaft 84 pointing towards transmission input 8$a$ is equipped with a first intermediate gear 81, and the other end thereof is equipped with a second intermediate gear 82. Intermediate gears 81 and 82 are non-rotatably connected to intermediate shaft 84. The first intermediate gear 81 engages with input gear 80, while the second intermediate gear 82 engages with output gear 83.

Transmission 8 is thus configured as a gear transmission with intermediate stage 8$c$ to provide a certain transmission ratio between transmission input 8$a$ and transmission output 8$b$. Gears 80, 81, 82, 83 in this instance are gearwheels with spur toothing, e.g., straight or helical gearing. Of course, other gearing types are possible. Transmission 8 is only represented schematically here, and may be a planetary transmission, for example.

The variant of FIG. 4 shows a transmission 8 designed as an electric motor transmission with a generator 20 and an electric motor 21.

Here too, housing 9 of transmission 8 is made up of sections of the seismic mass 4, and is connected in fixed manner to inertia ring 4c. Rotor 7 is supported rotatably in the associated housing section in transmission input 8a. In the same way, an associated housing section forms a bearing point for output shaft 8d in transmission output 8b.

In this instance, generator 20 is equipped with a rotor 20a, e.g., as an internal rotor with permanent magnets which is non-rotatably connected to the end of the rotor 7 of electrical machine 5 in transmission input 8a. Rotor 20a is arranged rotatably inside a stator 20b arranged in housing 9.

Motor 21 is equipped with a rotor 21a and a stator 21b mounted inside housing 9. The end of output shaft 8d that protrudes into housing 9 is non-rotatably connected to rotor 21a of motor 21. This rotor 21a is for example also an internal rotor with permanent magnets and also arranged rotatably inside stator 21b of motor 21.

Stator 20b of generator 20 is equipped with a winding which is connected in electrically conductive manner with a winding of stator 21b of motor 21 via a connection 22. This connection is only represented schematically, of course special generator/engine controls may be provided to control and regulate generator 20 and motor 21.

An intermediate stage 8c of transmission 8 is not shown here. It is created by the mechanical and electrical configuration of generator 20 and motor 21, wherein the generator/engine controls mentioned above are also used.

Motor 21 functions as the at least one actuator device 19.

FIG. 5 shows a schematic representation of a hydraulic transmission similar to that in FIG. 2 as transmission 8. This configuration of transmission 8 with a pump 18 and an actuator device 19 is particularly preferred for transmitting large, fast alternating torques.

Housing 9 is again part of seismic mass 4 and forms bearing points both in transmission input 8a for rotor 7 of electrical machine 5 and in transmission output 8b for output shaft 8d. The seals needed are not shown here, but they are of course essential.

Rotor 7 is coupled non-rotatably with pump 18 in transmission input 8a. Pump 18 may be for example a standard commercial gear pump and has an inlet 18a and an outlet 18b for a pump medium, e.g., a special oil.

Actuator device 19 may be e.g. a radially disposed hydraulic cylinder, of which several may also be present. It is also possible for actuator device 19 to be realized as a displacement vane or also as a gear pump. Actuator device 19 has an inlet 19a and an outlet 19b for the pump medium.

The side of actuator device 19 facing transmission output 8b is non-rotatably connected to output shaft 8d, e.g., in such manner that the one or more displacement vane(s) and the output gearwheel are coupled with output shaft 8d.

Inlet 18a of pump 18 is connected to the outlet 19b of actuator device 19 via a first connecting line 23. A second connecting line 24 connects outlet 18b of pump 18 to inlet 19a of actuator device 19. Connection lines 23, 24 serve to transport the pump medium and are designed to sustain the high media pressures that occur during operation of transmission 8 and have corresponding cross sections. Connection lines 23, 24 are arranged inside housing 9 or conformed therein.

Figure 6:
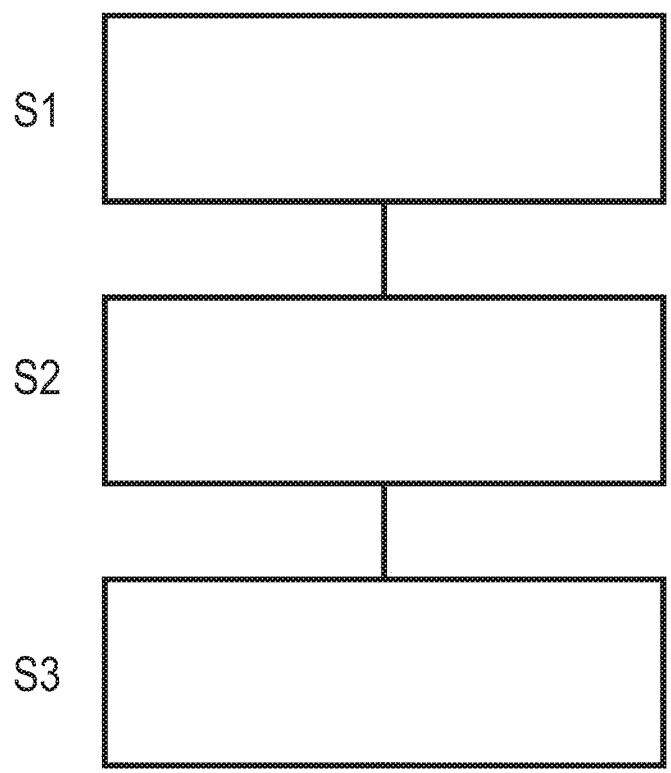
FIG. 6 is a schematic flowchart of a method according to the invention.

FIG. 6 shows a schematic flowchart of an exemplary method according to the invention for applying a torque to shaft 2 of the allocated machine, in particular a reciprocating piston engine.

In a first method step S1, input data with a requirement for torque is detected. Such a requirement for torque may be for example a starting process of the engine, a braking process, an acceleration requirement when increasing speed, a damping requirement for damping rotary oscillations of shaft 2 and the like.

This is effected by control device 11 receiving corresponding commands and datasets from engine controller 16 and/or from measuring device 15.

In a second method step S2, actuation data for electrical machine 5 is carried out on the basis of the collected input data for the requirement for torque.

Finally, in a third method step S3 electrical machine 5 is actuated on the basis of the actuation data determined in this way to drive pump 18 and generator 20 to generate torques for application of a torque to shaft 2 by actuators 19 or by motor 21 and at the respective transmission output 8b.

The torque to be applied may have various profiles.

For example, a torque that is applied to shaft 2 for a starting process and/or acceleration may rise from a zero point to a certain positive value, which e.g., may also remain constant for a certain period and then fall back to zero.

In the case of a braking process, the torque is negative, i.e. it progresses from the zero point towards negative values, and of course it may also remain constant and then rise back to the zero point again.

Of course, these torque profiles can also be recurring or repetitive.

An alternating torque is also possible, wherein the torque profile may cross the zero line from positive values to negative values and vice versa. Of course, this profile may also be periodic, damped or undamped or even cumulative in certain time intervals. Such an alternating torque is applied to shaft 2 particularly for damping rotary oscillations thereon.

For the purpose of damping rotary oscillations in shaft 2, initially in the first method step S1 measurement data with rotary oscillation information on shaft 2 is collected by measuring device 15 and the rotary oscillation information is analyzed. At the same time, engine control 16 receives input data with information about the rotating speed, angular position etc. of shaft 2.

In the second method step S2, actuation data for electrical machine 5 is implemented on the basis of the collected input data. In this context, for example, the algorithm for active vibration damping as described in document WO 2014/118245 A1 is used.

Finally, in the third method step S3, electrical machine 5 is actuated on the basis of the actuation data determined in this way to drive pump 18 and generator 20 to generate torques for damping vibration in shaft 2 by actuators 19 or by motor 21 and at the respective transmission output 8b for active damping of the rotary oscillations of shaft 2. At the same time, the torque for damping rotary oscillations of shaft 2 is applied by actuator devices 19, motor 21 and at transmission output 8b between shaft 2 and the co-rotating seismic mass 4. The torque for damping rotary oscillations of shaft 2 is generated by relative acceleration between seismic mass 4 and shaft 2.

The invention is not limited by the embodiment described in the preceding text, and may be modified without departing from the scope of the accompanying claims.

Thus, for example, it is conceivable that seismic mass 4 may be equipped with a further measuring device, which cooperates with the regulating unit 14 thereof.

An angular position of shaft 2 may also be determined in measuring device 15.

It is further conceivable that electrical machine 5, generator 20 and/or electric motor 21 may be constructed as "external rotors".

It is also conceivable that the actuator arrangement 1 might also be usable for damping rotary oscillations in shafts of machines other than reciprocating piston engines. For example, actuator arrangement 1 may be able to be used in machines whose operating states may be characterized as semi-stationary.

LIST OF REFERENCE SIGNS

1 Actuator arrangement
2 Crankshaft
2a Axis of rotation
2b Front end
3 Frame
4 Seismic mass
4a Drive side
4b Coupling side
4c Inertia ring
5 Electrical machine
6 Stator
7 Rotor
8 Transmission
8a Transmission input
8b Transmission output
8c Intermediate stage
8d Output shaft
8e Coupling section
9 Housing
10 Spring unit
11 Controller
12 Control device
13 Engine control
14 Regulating unit
15 Measuring device
16 Engine controller
17 Regulating device
18 Pump
18a Inlet
18b Outlet
19 Actuator device
19a Inlet
19b Outlet
20 Generator
20a Rotor
20b Stator
21 Motor
21a Rotor
21b Stator
22 Connection
23,24 Connection
80 Input gear
81, 82 Intermediate gear
83 Output gear
84 Intermediate shaft
n Rotary motion
S1 . . . 3 Method step

The invention claimed is:

1. An actuator arrangement for applying a torque to a shaft of a machine, comprising:
   a) at least one actuator device for applying the torque;
   b) at least one rotatable seismic mass coupled with the shaft;
   c) at least one electrical machine to supply drive energy for the actuator device;
   d) at least one transmission, via which the shaft is coupled with the electrical machine to drive the shaft; and
   e) a controller for controlling the electrical machine based on rotary vibration information; wherein:
   the torque applied by the actuator device to the shaft of the machine is an alternating torque applied between the seismic mass and the shaft that damps rotary oscillations of the shaft to reduce shaft vibrations;
   the shaft is a crankshaft of a reciprocating piston machine, and the actuator device is configured to apply the torque between the seismic mass and the crankshaft of the reciprocating piston machine;
   the actuator device forms a coupling between the seismic mass and the shaft;
   the seismic mass is coupled with the shaft in such manner that the seismic mass rotates at a different speed than the shaft;
   the transmission and the actuator device are arranged on the seismic mass;
   the electrical machine is configured as an electric motor with a stator and a rotor, wherein the stator is fixedly fastened to a frame and the rotor is coupled with the actuator device either indirectly via the transmission or directly; and
   the transmission includes at least one generator and the electric motor, the electric motor forms the actuator device, and the generator is coupled with the rotor of the electrical machine.

2. The actuator arrangement as claimed in claim 1, wherein the transmission includes a housing fixedly connected to the seismic mass.

3. The actuator arrangement as claimed in claim 1, wherein the rotatable seismic mass and the electrical machine together with the shaft have the same axis of rotation.

4. The actuator arrangement as claimed in claim 3, wherein the electric motor is configured for a rotating speed of ±16,000 rpm.

5. The actuator arrangement as claimed in claim 1, wherein the transmission is a gear transmission, wherein the actuator device is formed by an output gear of the transmission, and wherein a transmission input is coupled with the rotor of the electrical machine.

6. The actuator arrangement as claimed in claim 1, wherein the transmission includes at least one pump, embodied as a hydraulic pump, and which has the actuator device, wherein the pump is coupled with the rotor of the electrical machine, and wherein the actuator device is embodied as a radially disposed hydraulic cylinder of the pump, as a displacement vane, or as a gear pump.

7. The actuator arrangement as claimed in claim 1, wherein the generator is coupled to the rotor to supply energy to one or more piezoelements or piezoactuators.

8. The actuator arrangement as claimed in claim 1, wherein the rotatable seismic mass is also coupled with the shaft via a spring unit.

9. The actuator arrangement as claimed in claim 8, wherein the spring unit includes springs connected in parallel.

10. The actuator arrangement as claimed in claim 1, further comprising a device for braking the shaft.

11. The actuator arrangement as claimed in claim 10, wherein the device for braking the shaft comprises the electrical machine, and wherein the electrical machine provides for energy recovery.

12. The actuator arrangement as claimed in claim 1, further comprising a device for accelerating the shaft, wherein the electrical machine generates acceleration processes.

13. The actuator arrangement as claimed in claim 1, further comprising at least one measuring device for detecting the rotary vibration information, wherein the rotary vibration information is rotary vibration information about the shaft, and wherein the controller is configured to control the electrical machine on the basis of the rotary vibration information about the shaft detected by the measuring device to apply the torque for damping rotary vibrations of the shaft.

14. The actuator arrangement as claimed in claim 13, wherein the controller includes a regulating unit providing a superimposed rotating speed regulation to the seismic mass.

15. A method for applying a torque to a shaft of a machine, comprising:
(S1) providing an actuator arrangement including a) at least one actuator device for applying the torque, b) at least one rotatable seismic mass coupled with the shaft, c) at least one electrical machine to supply drive energy for the actuator device, d) at least one transmission, via which the shaft is coupled with the electrical machine to drive the shaft, and e) a controller for controlling the electrical machine based on rotary vibration information, such that the torque applied by the actuator device to the shaft of the machine is an alternating torque applied between the seismic mass and the shaft that damps rotary oscillations of the shaft to reduce shaft vibrations, the shaft is a crankshaft of a reciprocating piston machine, and the actuator device is configured to apply the torque between the seismic mass and the crankshaft of the reciprocating piston machine, the actuator device forms a coupling between the seismic mass and the shaft, the seismic mass is coupled with the shaft in such manner that the seismic mass rotates at a different speed than the shaft, the transmission and the actuator device are arranged on the seismic mass, the electrical machine is configured as an electric motor with a stator and a rotor, wherein the stator is fixedly fastened to a frame and the rotor is coupled with the actuator device either indirectly via the transmission or directly, and the transmission includes at least one generator and the electric motor, the electric motor forms the actuator device, and the generator is coupled with the rotor of the electrical machine;
(S2) detecting a requirement for torque;
(S3) determining actuation data for said at least one electrical machine to supply drive energy for the actuator device on the basis of the requirement for torque detected; and
(S4) applying the torque to the shaft by actuating the at least one electrical machine to drive the at least one actuator device.

\* \* \* \* \*